United States Patent Office 3,134,688
Patented May 26, 1964

3,134,688
PIGMENTED SYNTHETIC RUBBER COATING
Charles H. Hempel, Manitowoc, Wis., assignor to Heresite
& Chemical Company, a corporation of Wisconsin
No Drawing. Filed Sept. 27, 1960, Ser. No. 58,652
1 Claim. (Cl. 117—161)

This invention relates to a pigmented synthetic rubber coating produced from a synthetic rubber latex having a high polymer content and low emulsifier content and methods for making the same.

This application constitutes an improvement on the U.S. patent to Charles Henry Hempel, 2,467,382, dated April 19, 1949, which discloses a method of making a synthetic rubber latex.

Synthetic rubber latices made by the known prior art methods when polymerized to conversions of over 80% generally had a solids content of 20 to 40% and an emulsifier content up to 20% as based on the polymer content of the latex. The emulsifier was normally a common soap and its presence was necessary to form a stable latex during polymerization and for handling after polymerization. This high emulsifier content was of no importance when the latex was coagulated as by an acid since the emulsifier could be removed by washing. However, if the latex was not to be coagulated before use but was to be employed as a latex in a dipping or spraying process, the high emulsifier content resulted in a deleterious effect on the properties of the polymer.

Moreover this problem was further complicated, since a decrease percentagewise in the emulsifier content of the latex also has a deleterious effect on the polymer. It is well known in the art of producing synthetic rubber latex by emulsion polymerization that the number of latex particles per unit volume is directly proportional to the amount of emulsifier or soap present in the emulsion, and that the latex particle size is inversely proportional to the amount of soap present. Therefore, if an attempt is made to increase the solids content of the latex by merely decreasing the water content of the recipe and keeping the emulsifier content constant, the small size of the latex particles together with the large number of particles will result in a latex of excessively high viscosity so as to even interfere with proper agitation during polymerization.

On the other hand, if the emulsifier content is lowered the stability of the latex is impaired in handling after polymerization by the formation of coagulum during compounding and spraying.

It is an object of this invention, therefore, to produce a synthetic rubber latex which has a proper balance of monomers, water, emulsifiers, initiator, modifier, and electrolyte and thus has a stable high solids content with good physical characteristics.

It has been found that if an organic pigment in the form of a thick alkaline paste is added to the latex, there is formed a sprayable latex composition possessing excellent adherence without losing any of the properties of resistance and the like attributable to synthetic rubbers. This paste is produced by mixing a suitable pigment with water and glycerine and then grinding on a roller mill or the like to provide proper dispersion of the pigment in the paste. The paste is then added to the latex accompanied or followed by the usual anti-oxidants, vulcanizers, and where desired, thickening agents.

I have found that the concentration of the soap emulsifier in a synthetic latex may be effectively lowered without interfering with the stability of the latex or the rate of its polymerization by adding a similar percentage of a synthetic anionic emulsifier.

The soaps which are satisfactory as emulsifiers in the methods of this invention are the alkali metal salts of saturated or unsaturated fatty acids containing from about 12 to 18 carbon atoms. About 0.5 to 4.0% by weight of the butadiene-styrene copolymer of soap is preferred while from about 1.5 to 2.5% by weight of the copolymer is most preferred. Examples are sodium oleate, sodium palmitate, sodium laurate and potassium oleate.

The synthetic anionic emulsifiers which are used in the methods of this invention will be present in an amount from about 0.5 to 4.0 by weight of the butadiene-styrene copolymer and preferably from about 1.5 to 2.5% by weight of the copolymer. Among the synthetic emulsifiers which are satisfactory for use in the methods of this invention are the alkali metal salts of alkyl sulfates containing from about 12 to 18 carbon atoms, the alkali metal salts of alkyl aryl sulfonic acids wherein the alkyl group contains from about 1 to 10 carbon atoms and the aryl group consists of either the benzene or naphthalene group; the alkali metal sulfonates of aliphatic esters and the alkali metal sulfonates of aliphatic amides. Examples of these synthetic emulsifiers are sodium lauryl sulfate, sodium oleyl sulfate, isopropyl naphthalene sodium sulfonate, isobutyl naphthalene sodium sulfonate, decylbenzene sodium sulfonate, sodium xylene sulfonate, ethyl oleate sodium sulfonate, and ethyl oleamide sodium sulfonate.

The amount of butadiene and styrene monomers present in the methods of this invention may vary between the limits of 60% butadiene and 40% styrene to 30% butadiene and 70% styrene.

The copolymerization of the butadiene and styrene is in an aqueous medium. The amount of water present by weight should be less than the combined weight of the monomers, but should be sufficient to produce a latex of about 50% solids at the desired conversion of monomers of 80% or higher.

Also, small quantities of an initiator, a modifier, and an electrolyte may be used in the methods of this invention. The initiator when used will be an alkali metal persulfate or peroxide suhch as potassium persulfate and will be present in a range from about 0.1 to 4.0% by weight of the copolymer and more preferably from about 0.1 to 0.3% by weight of the copolymer. As a modifier the mercaptans or the xanthogens may be used in the methods of this invention. Modifiers such as di-isopropylxanthogen disulfide are satisfactory in the range of 0.05 to 0.50% by weight and for the mercaptans about 0.10 to 2.5% by weight. The presence of the persulfates or peroxides acts as electrolyte, however this may be enhanced by the presence of an alkali metal hydroxide such as sodium hydroxide which will be present in an amount generally from about 0.1 to 2% by weight to hold the pH of the latex between about 8.5 and 9.5 at all times. In an example of carrying out the polymerization of the butadiene and styrene, 2.5 parts of sodium oleate soap and 2.5 parts of sodium isopropyl naphthalene sulfonate are dissolved in 90 parts of water; to this solution are then added 50 parts styrene, 0.2 part sodium hydroxide and 0.3 part potassium persulfate; the mixture is then pumped into a pressure reactor and 50 parts of butadiene added; the mixture is then heated under agitation at about 55° centigrade for about 24 hours during which time the pressure will have dropped considerably. Upon completion of the reaction a white liquid is obtained called latex. The latex is then mixed with a pigment, preferably titanium dioxide, which is added in a paste form with water (after having been brought to the proper pH by the addition of an alkalizer), and the necessary antioxidant, vulcanizer, and thickening agent or stabilizer.

The pigment paste is made by grinding on a roller mill a mixture of 4 parts titanium dioxide, 1 part glycerine, 1 part water, and 0.01 to 0.05 parts sodium hydroxide to maintain the pH of the paste about 9.0 to 9.5 at all times.

An example of the compounded latex coating material is as follows:

| | Parts |
|---|---|
| Latex (50% solids) | 100 |
| Titanium dioxide | 24 |
| Glycerine | 6 |
| Sodium hydroxide | 0.03 |
| Dibutylparacresol (antioxidant) | 0.50 |
| Sulfur | 0.60 |
| Zinc diethyl dithiocarbamate | 1.0 |

All compounding ingredients must be dispersed in water before adding to the latex.

The preferred ratio of paste to latex (based on a 50% solids content of the latex) is 30 parts to each 100 parts of latex, with 40 parts of the paste being the maximum and 20 parts the minimum. Obviously, pigments other than titanium dioxide may be used such as, for example, other inorganic pigments including chrome orange, chrome red, chrome green, the ion oxide reds, and English vermilion.

The compounded latex may then be applied by spray or by dipping to a metallic surface or other surface to be protected and after air drying to evaporate the water, the latex coating is cured by heating at 250° F. for about 60 minutes or according to the best schedule depending upon the vulcanizing agents present. Multiple coats may be applied to achieve any desired thickness of coating. A tough, strong, rubbery coating is produced which is suitable for the protection of metallic or other surfaces against corrosion.

The anti-oxidants may be any used in the usual compounding of latex such as the aldehyde-amine types or the phenolic types.

The vulcanizers may be any generally used in the art of curing latices, preferably of the dithiocarbamate type known as ultra-accelerators.

To secure proper viscosity of the mixture it may be necessary to add a thickener, and for this purpose the water soluble cellulose gums such as methyl cellulose or carboxy methyl cellulose or similar materials may be used.

Having described my invention as related to the embodiments set out herein, it is my intention that the invention be not limited by any of the details of description unless otherwise specified, but rather be construed broadly within its spirit and scope as set out in the accompanying claim.

I claim:

The method of producing a tough adherent synthetic rubber coating on an article which comprises producing a latex of butadiene and styrene copolymer in an aqueous emulsion, thoroughly mixing with 100 parts of the copolymer 20 to 40 parts by weight of a thick alkaline paste of an inorganic pigment prepared by grinding together approximately 4 parts of pigment to 1 part of glycerine and 1 part water, all parts being by weight, and then adding thereto from 0.01 to 0.05 part sodium hydroxide to maintain the pH of the paste at about 9.0 to 9.5, applying the mixture to the surface of the article to be coated and then curing the same at an elevated temperature.

References Cited in the file of this patent

UNITED STATES PATENTS

| 2,498,712 | Ryden | Feb. 28, 1950 |
| 2,883,355 | Balfe et al. | Apr. 21, 1959 |
| 2,918,194 | Quigley et al. | Dec. 22, 1959 |

FOREIGN PATENTS

| 544,927 | Great Britain | May 4, 1942 |